United States Patent [19]

Müller et al.

[11] Patent Number: 5,760,148

[45] Date of Patent: Jun. 2, 1998

[54] PROCESS AND DEVICE FOR PREPARING A POLYMER OF TETRAFLUOROETHYLENE IN AQUEOUS SUSPENSION

[75] Inventors: Gerd Müller, Burgkirchen; Thomas Schöttle, Burghausen, both of Germany

[73] Assignee: Dyneon GmbH, Germany

[21] Appl. No.: 455,391

[22] Filed: May 31, 1995

Related U.S. Application Data

[63] Continuation of Ser. No. 74,043, Jun. 8, 1993.
[51] Int. Cl.$^6$ ................................................ C08F 2/16
[52] U.S. Cl. ................................. 526/88; 528/502 F
[58] Field of Search ......................... 526/88; 528/502 F

[56] References Cited

U.S. PATENT DOCUMENTS

| | | | |
|---|---|---|---|
| 3,245,972 | 4/1966 | Anderson et al. | 526/255 |
| 3,462,401 | 8/1969 | Kometani et al. | 260/92.1 |
| 3,690,569 | 9/1972 | Leverett | 526/88 |
| 4,368,296 | 1/1983 | Kuhls et al. | 526/250 |
| 4,379,900 | 4/1983 | Sulzbach | 526/247 |
| 4,408,007 | 10/1983 | Kuhls et al. | 526/250 |
| 5,153,285 | 10/1992 | Felix et al. | 526/255 |
| 5,189,143 | 2/1993 | Honda et al. | 528/502 |

FOREIGN PATENT DOCUMENTS

| | | |
|---|---|---|
| 0 078 660 | 5/1983 | European Pat. Off. . |
| 2 125 698 | 12/1971 | Germany . |

OTHER PUBLICATIONS

Perry's Chemical Engineers' Handbook, 6th Ed., 1984, McGraw-Hill, NY.NY, pp. 19–5 to 19–10 1984.
An LDA Study of Turbulent Flow in a Baffled Vessel Agitated By a Pitched Blade Turbine, Z. Jaworski, pp. 313–320, Trans IChemE, vol. 69, Part A, Jul. 1991.

*Primary Examiner*—David W. Wu
*Attorney, Agent, or Firm*—Connolly & Hutz

[57] ABSTRACT

The polymerization of tetrafluoroethylene in aqueous suspension can be carried out with high conversion if the medium is thoroughly mixed using an axially conveying stirrer element in such a manner that a cone forms at least as far as the vicinity of the stirrer element. In the region of this stirrer element there are expediently arranged baffles which extend only over a part of the filling height of the reactor.

19 Claims, No Drawings

PROCESS AND DEVICE FOR PREPARING A POLYMER OF TETRAFLUOROETHYLENE IN AQUEOUS SUSPENSION

This is a continuation of Ser. No. 08/074,043, filed Jun. 8, 1993 pending.

The invention relates to a process and a device for preparing a polymer of tetrafluoroethylene (TFE) in aqueous suspension, as defined in the patent claims.

The invention is based on the object of preparing in a batchwise-operated stirred reactor a polymer of TFE in aqueous suspension with the highest possible conversion, with the aim of producing granules which are as round as possible and have high bulk density. It is a further aim to simplify the processes known hitherto for producing such products.

Attempts to increase the conversion in the processes known hitherto encounter difficulties in that the polymer formed can absorb the gaseous monomer and then floats on the surface of the polymerization medium. This makes it more difficult to carry out the reaction in a defined way, in particular to remove the heat of reaction from the exothermic polymerization. There is thus the risk of local overheating, which can lead to sintering of the polymer and even to ignition of the monomeric TFE, which has a tendency toward deflagration. The object is thus to suspend the resultant polymer particles in the highest possible concentration and as homogeneously as possible in the aqueous liquor and, in so far as they float, to draw them off again from the surface. In addition, the monomer must be transferred from the gas space of the polymerization reactor to the site of reaction by stirring in and dispersing the gas into the aqueous liquor. This dispersion of the gas in the liquor should take place as homogeneously as possible. In addition, the removal of the heat of reaction must be ensured. A further object is to form uniform polymer grains with a high bulk density which are as round as possible, facilitating the handling of the product in the subsequent processing operations such as drying and grinding.

U.S. Pat. No. 3,245,972 discloses a process for preparing polytetrafluoroethylene (PTFE) molding powder by polymerizing TFE with stirring in contact with an aqueous medium. In a preferred embodiment of this process stirring takes place with a controlled power supply with a power consumption in the range from 0.0004 to 0.002 mkg/sec/ml with a ratio of power to discharge coefficient of at least 1.4. Of the types of stirrers discussed, a flat paddle stirrer arranged vertically with a ratio of power to discharge coefficient of 3.4 is preferred. Less suitable stirrers are those with flat blades disposed at an angle of 15° to the horizontal, which have a ratio of only 1.45, and a gas turbine with a ratio of 1.65, a propeller mixer with a ratio of 1.60 and a blade stirrer with horizontal shear edges with a ratio of 1.3.

U.S. Pat. No. 3,462,401 discloses a similar process in which polymerization is carried out in the presence of a virtually water-insoluble organic liquid with a boiling point below 150° C., in the presence of which chain transfer does not take place easily. It is pointed out that the stirring conditions should be chosen appropriately. This is effected by anchor-like stirrers, if appropriate with an additional further stirrer with propeller-like blades which is mounted on the base, or with a propeller-like stirrer with four stirring blades.

The object described at the outset cannot be satisfactorily achieved with these known processes.

A process for preparing a polymer of TFE has now been found wherein a stirrer element is used which, in addition to an axial flow component, also generates a tangential flow component such that a cone (or vortex or spout) forms, at least as far as the vicinity of the stirrer element, preferably as far as the stirrer element. The axial component ensures thorough mixing of the vessel contents and homogeneous suspension of the polymer particles in the aqueous liquor. In order to form a symmetrical cone, the stirrer spindle is arranged substantially vertically.

The stirrer element is preferably an inclined-blade stirrer which is expediently mounted in the vicinity of the base of the reactor. The tangential flow generated by the stirrer element is preferably reduced by baffles and partly diverted into the axial direction such that the desired stirring pattern develops. These baffles do not as is normal in chemical engineering—extend over the entire filling height of the reaction vessel, but rather essentially over the region in which the stirrer element is mounted.

In the region of the stirrer element, two baffles are expediently arranged opposite one another and are advantageously designed so as to be rotatable.

The use of baffles usually serves to disrupt the formation of a cone. The disadvantage of the known arrangement of baffles is that "dead water zones" occur in which the floating product can sinter together to form large lumps. Furthermore, the product can accumulate at the phase boundary to such an extent that—especially after stoppage of the stirrer—it can no longer be stirred back into the liquor.

The procedure preferably follows that known from U.S. Pat. No. 5,153,285 for preparing granular TFE polymer which cannot be processed from the melt, by suspension-polymerizing TFE and 0 to 0.6 mol-% of a modifying comonomer in the aqueous phase in the presence of free radical-forming initiators, in which a mixture of TFE and an inert gas, for example noble gases such as argon, carbon dioxide, perfluoromethane or perfluoroethane, but in particular nitrogen, is injected before polymerization is commenced. This process comprises the total pressure of the injected mixture being 5 to 50 bar, preferably 5 to 30 bar, and the concentration of the TFE in this mixture being 30 to 70 mol-%, the said concentration being held in this range by appropriate topping up of TFE during the polymerization. Preferred embodiments consist in topping up the TFE during the polymerization substantially to the extent to which it is consumed or topping up in such a manner that the total pressure remains substantially constant.

The invention provides a number of advantages: based on the polymerization medium, up to approximately 25% more TFE can be converted compared with conventional suspension polymerization of TFE, a solids content of up to 60 kg/100 l of medium being reached. The space-time yield is thereby considerably increased.

High bulk densities can be achieved for example by the process of U.S. Pat. No. 4,379,900 by the use of 0.004 to 0.075 mol-% of copolymerized units of a perfluoroalkyl vinyl ether. According to the process of U.S. Pat. No. 3,245,972, high bulk densities are obtained by carrying out the polymerization with the particle enlargement of seed nuclei. According to the invention, high bulk densities can be obtained without measures of this kind: if, under comparable conditions, maintaining an average particle diameter of 1100 μm, the process of U.S. Pat. No. 3,245,972 is followed, a bulk density of 400 g/l is obtained, whilst according to the invention a bulk density of 500 g/l is obtained.

A further great advantage of the invention consists in its safety since, even with a TFE conversion increased by 25%, the heat is reliably removed and the floating polymer can be reliably homogenized again at any time—even after stoppage of the stirrer. In addition, the formation of coarse particles is avoided. Rather, a uniform, compact and spherical grain with a greatly reduced proportion of fibriform particles is obtained.

The invention is explained in greater detail in the following examples.

EXAMPLE 1

A stainless steel reactor with a capacity of 1,800,000 parts of water as polymerization medium, equipped with a vertical inclined-blade stirrer (blade with 45° inclination to the spindle, arranged such that the bottom edge of the stirrer element is disposed at approximately 30% of the filling height of the vessel) and two rotatable baffles which are mounted opposite one another and extend on the vessel wall at a distance of approximately 5% of the vessel diameter from the lower edge of the stirrer blade to approximately 80% of the filling height of the vessel, is filled with 1,000,000 parts of demineralized water and 15 parts of ammonium oxalate dissolved therein. The vessel is freed from oxygen by alternative evacuation and purging with postpurified nitrogen, and the temperature adjusted to 15° C. Then 7 bar of nitrogen and 6 bar of TFE are injected in sequence, corresponding to a total pressure of 13 bar. The polymerization is started after turning on the stirrer by the single metering in of 2 parts of $KMnO_4$ dissolved in 2500 parts of degassed water. TFE is constantly fed in during the polymerization and particularly at such a rate that the concentration of TFE in the gas space in the reactor, which gas space becomes smaller on account of the polymer being produced, is substantially unchanged. This is achieved in that the setpoint value of the TFE pressure regulator is increased in stages corresponding to the reduction of the gas volume. The reduction of the gas volume is calculated from the amount of TFE fed into the vessel and measured by integration and the density ($\rho$=2.3 g/cm$^3$) of the PTFE formed. The total pressure is thus constantly increased during the polymerization. When the TFE feed quantity reaches 600,000 parts, the total pressure is approximately 1.33 times the initial pressure. After the aforementioned feed quantity of 600,000 parts of TFE is reached, the polymerization is terminated by closing the TFE valve and releasing the pressure.

The reactor is flushed several times with $N_2$ and the polymer thereby degassed. The suspension is coarsely separated from the water via a screen. The crude polymer is dried at 220° C. in a pneumatic drier. It has a mean particle diameter of 1100 μm and a bulk density of 500 g/l.

Comparative example

If the procedure according to Example 1 is followed, but with the use of an anchor stirrer, then, after feeding in 480,000 parts of TFE, the product floats to such an extent that it increasingly sinters together. The polymerization must therefore be terminated at this conversion.

The product also has an average particle diameter of 1100 μm, but a bulk density of only 400 g/l.

We claim:

1. A process for polymerizing tetrafluoroethylene to yield a polymer of tetrafluoroethylene, having a uniform, compact, and spherical grain, and without the need of first preparing a seed polymer, in an aqueous suspension, wherein said tetrafluoroethylene and inert gas are fed into a polymerization reactor and the polymerization is started after turning on a stirrer element and metering in a free radical forming initiator into said polymerization reactor and wherein water is used as a polymerization medium, and said stirrer element is used which generates, in addition to an axial flow component, also a tangential flow component optionally by means of baffles, without producing dead water zones, such that a vortex or spout forms at least as far as the vicinity of the stirrer element.

2. The process as claimed in claim 1, wherein the stirrer element is an inclined-blade stirrer.

3. The process as claimed in claim 1, wherein the stirrer element is arranged in the vicinity of the base of the polymerization reactor.

4. The process as claimed in claim 3, wherein the stirrer element is an inclined-blade stirrer.

5. The process as claimed in claim 1, wherein in the region of the stirrer element baffles are mounted which extend only over part of the filling height of the reactor.

6. The process as claimed in claim 5, wherein two baffles are mounted opposite one another.

7. The process according to claim 5, wherein the baffles are arranged so as to be rotatable.

8. The process according to claim 6, wherein the baffles are arranged so as to be rotatable.

9. The process as claimed in claim 1, wherein said process produces a solids content of not more than 60 kg/100 l of medium being reached.

10. The process as claimed in claim 1, wherein said polymer of tetrafluoroethylene has an average particle diameter of 1100 μm while having a bulk density of 500 g/l.

11. The process as claimed in claim 1, wherein water is used as a polymerization medium.

12. In a process for preparing a high bulk density polymer of tetrafluoroethylene without the need of first preparing a seed polymer, in an aqueous suspension, wherein said tetrafluoroethylene and inert gas are fed into a polymerization reactor and the polymerization is started after turning on a stirrer element and metering in a free radical forming initiator into said polymerization reactor and wherein water is used as a polymerization medium, and the improvement consists essentially of said stirrer element used which generates, in addition to axial flow component, a tangential flow component optionally by means of baffles, without producing dead water zones, such that a cone forms at least as far as the vicinity of the stirrer element.

13. The process as claimed in claim 12, wherein the stirrer element is an inclined-blade stirrer.

14. The process according to claim 12, wherein the baffles are arranged so as to be rotatable.

15. The process as claimed in claim 12, wherein said process produces a solids content of up to 60 kg/100 l of medium being reached.

16. The process as claimed in claim 12, wherein said polymer of tetrafluoroethylene has an average particle diameter of 1100 μm while having a bulk density of 500 g/l.

17. The process as claimed in claim 16, wherein said process produces a solids content of up to 60 kg/100 l of medium being reached.

18. The process as claimed in claim 17, wherein the stirrer element is an inclined-blade stirrer and arranged in the vicinity of the base of the polymerization reactor and there are two baffles mounted opposite one another and said baffles are arranged so as to be rotatable.

19. The process as claimed in claim 12, wherein water is used as a polymerization medium.

* * * * *

UNITED STATES PATENT AND TRADEMARK OFFICE
CERTIFICATE OF CORRECTION

PATENT NO. : 5,760,148
DATED : June 2, 1998
INVENTOR(S) : Gerd Muller et al.

It is certified that error appears in the above-identified patent and that said Letters Patent is hereby corrected as shown below:

Title page, after item [22] Filed: May 31, 1995, please insert the following:  --[30] Foreign Application Priority Data
June 10, 1992 [DE] Germany..........42 18 965.9--

Signed and Sealed this

Ninth Day of March, 1999

Attest:

Attesting Officer

Q. TODD DICKINSON

Acting Commissioner of Patents and Trademarks